(12) United States Patent
Welsh (10) Patent No.: US 9,988,146 B2
(45) Date of Patent: Jun. 5, 2018

(54) ROTOR BALANCING APPARATUS (71) Applicant: Sikorsky Aircraft Corporation, Stratford, CT (US)

(72) Inventor: William A. Welsh, North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 510 days.

(21) Appl. No.: 14/512,868

(22) Filed: Oct. 13, 2014

(65) Prior Publication Data

US 2015/0132132 A1 May 14, 2015

Related U.S. Application Data (62) Division of application No. 14/075,520, filed on Nov. 8, 2013, now abandoned.

(51) Int. Cl.
*B64C 27/00* (2006.01)
(52) U.S. Cl.
CPC .................... *B64C 27/008* (2013.01)
(58) Field of Classification Search
CPC ............... B64C 27/001; B64C 27/008; B64C 2027/003; G01M 1/365; F16F 7/1028; F16F 15/22
See application file for complete search history.

(56) References Cited

U.S. PATENT DOCUMENTS

| 2,423,733 | A | * | 7/1947 | Stalker | B64C 27/37 416/117 |
| 2,539,562 | A | * | 1/1951 | Avery | B64C 27/37 416/135 |
| 3,812,724 | A | | 5/1974 | Curtz et al. | |
| 3,830,109 | A | | 8/1974 | Litvinovich et al. | |
| 4,002,086 | A | * | 1/1977 | Reinhall | G01M 1/365 451/343 |
| 4,213,661 | A | | 7/1980 | Marmol | |
| 4,432,253 | A | | 2/1984 | Kerlin | |
| 5,167,167 | A | | 12/1992 | Tiernan, Jr. et al. | |
| 5,256,035 | A | | 10/1993 | Norris et al. | |
| 5,273,398 | A | | 12/1993 | Reinfelder et al. | |
| 5,475,622 | A | | 12/1995 | Reinfelder et al. | |

(Continued)

FOREIGN PATENT DOCUMENTS

| DE | 3102726 A1 | 8/1982 |
| DE | 3145588 A1 | 5/1983 |

(Continued)

OTHER PUBLICATIONS

Extended European Search Report issued in EP Application No. 14191583.5; dated Mar. 13, 2015; 6 pages.

*Primary Examiner* — Justin Seabe
(74) *Attorney, Agent, or Firm* — Cantor Colburn LLP (57) ABSTRACT

A balancing apparatus for a rotary element is provided and includes a central hub portion and radial elements extending outwardly from the central hub portion. The balancing apparatus includes a conduit extending along the radial elements via the central hub portion, a mass movable within the conduit between the radial elements via the central hub portion and a mass balancing system which directs a movement of the mass within the conduit into and out of the central hub portion and along the radial elements.

10 Claims, 5 Drawing Sheets

(56) References Cited

U.S. PATENT DOCUMENTS

| | | |
|---|---|---|
| 5,490,436 A | 2/1996 | Coyne et al. |
| 5,537,861 A | 7/1996 | Seitelman et al. |
| 5,647,726 A * | 7/1997 | Sehgal ................. B64C 27/001 |
| | | 188/380 |
| 6,947,253 B2 | 9/2005 | Pfeiffer et al. |
| 7,069,654 B2 | 7/2006 | Robbins |
| 7,097,427 B2 | 8/2006 | Kuhns et al. |
| 7,775,107 B2 | 8/2010 | Holmquist |
| 8,029,240 B2 | 10/2011 | Cawthorne et al. |
| 8,122,785 B2 | 2/2012 | Czerniak et al. |
| 8,192,162 B2 | 6/2012 | Loftus et al. |
| 8,267,661 B2 | 9/2012 | Lamborn et al. |
| 8,308,435 B2 | 11/2012 | Storace et al. |
| 8,313,296 B2 | 11/2012 | Jolly et al. |
| 8,480,364 B2 | 7/2013 | Altieri et al. |
| 2012/0107095 A1 | 5/2012 | Juh |
| 2012/0301299 A1 | 11/2012 | Sherrill et al. |
| 2013/0062456 A1 | 3/2013 | McCollough et al. |
| 2013/0186170 A1 | 7/2013 | Trukenmueller |

FOREIGN PATENT DOCUMENTS

| | | |
|---|---|---|
| DE | 102010032985 A1 | 2/2012 |
| FR | 2461940 A1 | 2/1981 |

* cited by examiner

ROTOR BALANCING APPARATUS

CROSS-REFERENCE TO RELATED APPLICATION

This application claims the benefit of priority to application Ser. No. 14/075,520, which was filed on Nov. 8, 2013. The entire contents of application Ser. No. 14/075,520 are incorporated herein by reference.

BACKGROUND OF THE INVENTION

The subject matter disclosed herein relates to a rotor balancing apparatus and, more particularly, to a rotor balancing apparatus for a rotary element In helicopters and other rotorcrafts, rotors rotate about certain axis to provide lift and thrust forces. For example, the main rotor of a helicopter generally includes a number of blades emanating from a hub that rotates about the vertical axis. The blades interact with the air surrounding the helicopter to generate aerodynamic lift forces that provide lift for the helicopter. With this construction, any mass unbalance on the rotor or the blades can lead to vibration in the cabin of the helicopter, which can cause passengers to be uncomfortable. As such, correcting the mass unbalance of a helicopter rotor or blades is an important goal in helicopter design and manufacturing The above-noted mass unbalance can be caused by imperfect blade and hub manufacturing repeatability, blade paint and surface material erosion or damage, unequal moisture retention and regular or unscheduled maintenance. Currently, helicopters often use fixed, manually installed balance weights on the rotor hub to compensate for the mass unbalance. Adjustments of these weights are performed using various monitoring systems that collect vibration data, which can be used to determine where mass unbalances are located. In some cases, these systems collect the vibration data in the fuselage and compute required balance weights that should be installed to minimize the vibrations. Typically, 0-5 pounds of weights are added to hub arms as a result of this process.

It has been found, however, that the systems and processes for adding the weights can be expensive and may lead to certain errors, such as human errors associated with manual weight installations. Also, while the fixed balance weights may be suitable for ground runs where the vibration data was collected, optimal balance weights are known to change in-flight due to the unique flying characteristics of each rotor blade.

BRIEF DESCRIPTION OF THE INVENTION

According to one aspect of the invention, a balancing apparatus for a rotary element is provided and includes a central hub portion and radial elements extending outwardly from the central hub portion. The balancing apparatus includes a conduit extending along the radial elements via the central hub portion, a mass movable within the conduit between the radial elements via the central hub portion and a mass balancing system which directs a movement of the mass within the conduit into and out of the central hub portion and along the radial elements.

The mass balancing system may be activatable in-flight.

A sensing system may be coupled to the mass balancing system and configured to activate the mass balancing system in response to an unbalanced condition determination.

The mass balancing system may be configured to direct the movement of the mass from one radial element to another radial element.

The radial elements may include hub arms and the mass may include a heavy liquid.

The heavy liquid may include one or more of Mercury, Galinstan or Sodium Polytungstate.

The conduit may include piping extending along the hub arms and the mass balancing system may include a pump disposed along the piping which pumps the heavy liquid between the hub arms.

The mass balancing system may further include a pressurized volume disposed at distal ends of the piping and a diaphragm separating the pressurized volume from the heavy liquid.

The radial elements may include opposite ends of at least one rotor blade and the mass may include a gaseous fluid.

The conduit may include piping extending along the rotor blades and the mass balancing system may include a heating-cooling element disposed at distal ends of the piping which adjusts a temperature of the mass to change a phase of the mass between gaseous and nongaseous states.

The mass balancing system may further include a fluid reservoir fluidly coupled to the piping and disposed proximate to the heating-cooling element.

According to another aspect of the invention, a rotor system is provided and includes a central hub portion, hub arms extending outwardly from the central hub portion and a rotor balancing system including a conduit extending along the hub arms via the central hub portion, a heavy liquid movable within the conduit between the hub arms via the central hub portion and a mass balancing system which directs a movement of the heavy liquid into and out of the central hub portion and along the hub arms.

The heavy liquid may include one or more of Mercury, Galinstan or Sodium Polytungstate.

The conduit may include piping extending along the hub arms, and the mass balancing system may include a pump disposed along the piping, a pressurized volume disposed at distal ends of the piping and a diaphragm separating the pressurized volume from the heavy liquid.

The pump may be offset from an axis of rotation of the rotary element.

The diaphragm may be disposed radially outwardly from the pressurized volume.

The pressurized volume may be disposed radially outwardly from the diaphragm.

According to yet another aspect of the invention, a rotor system is provided and includes a central hub portion, rotor blades extending outwardly from the central hub portion and a rotor balancing system including a conduit extending along the rotor blades via the central hub portion, a gaseous fluid movable within the conduit between the rotor blades via the central hub portion and a mass balancing system which directs a movement of the gaseous fluid into and out of the central hub portion and along the rotor blades.

The conduit may include piping extending along the rotor blades, and the mass balancing system may include a heating-cooling element disposed at distal ends of the piping and a fluid reservoir fluidly coupled to the piping and disposed proximate to the heating-cooling element.

The heating-cooling element may be disposed radially outwardly from the fluid reservoir.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
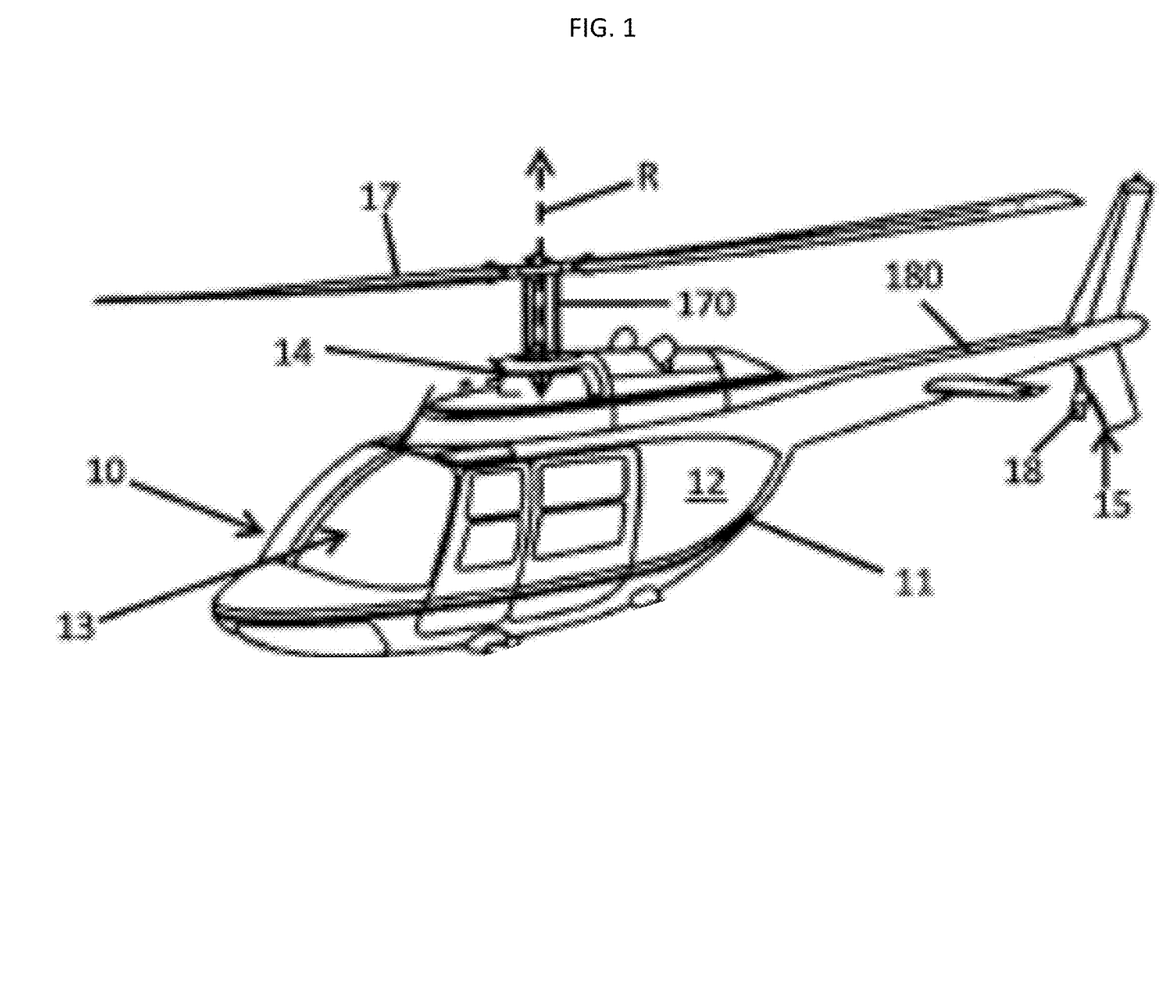
FIG. 1 is a schematic illustration of a helicopter in accordance with embodiments.

With reference to FIG. 1, a helicopter 10 is provided. The helicopter 10 includes an airframe 11 having a fuselage 12. The fuselage 12 defines a cabin 13 in an interior thereof, a main rotor section 14 and a tail section 15. One or more engines may be operably disposed within the airframe 11, a main rotor 17 may be rotatably supported at the main rotor section 14 and a tail rotor 18 may be rotatably supported at the tail section 15. The main rotor 17 is supported by a main rotor shaft 170 and is disposed to rotate about an axis of rotation R defined along a longitudinal axis of the main rotor shaft 170. The rotation of the main rotor 17 provides for lift force of the helicopter 10. The tail rotor 18 is supported by a tail 180 and rotation of the tail rotor 18 provides for anti-torque control of the helicopter 10. While shown as a helicopter having a single main rotor 17 and a tail rotor 18, it is understood that aspects can be used with other types of helicopters including those with coaxial rotors, such as the X2® helicopter, or other types of rotor crafts.

Figure 2:
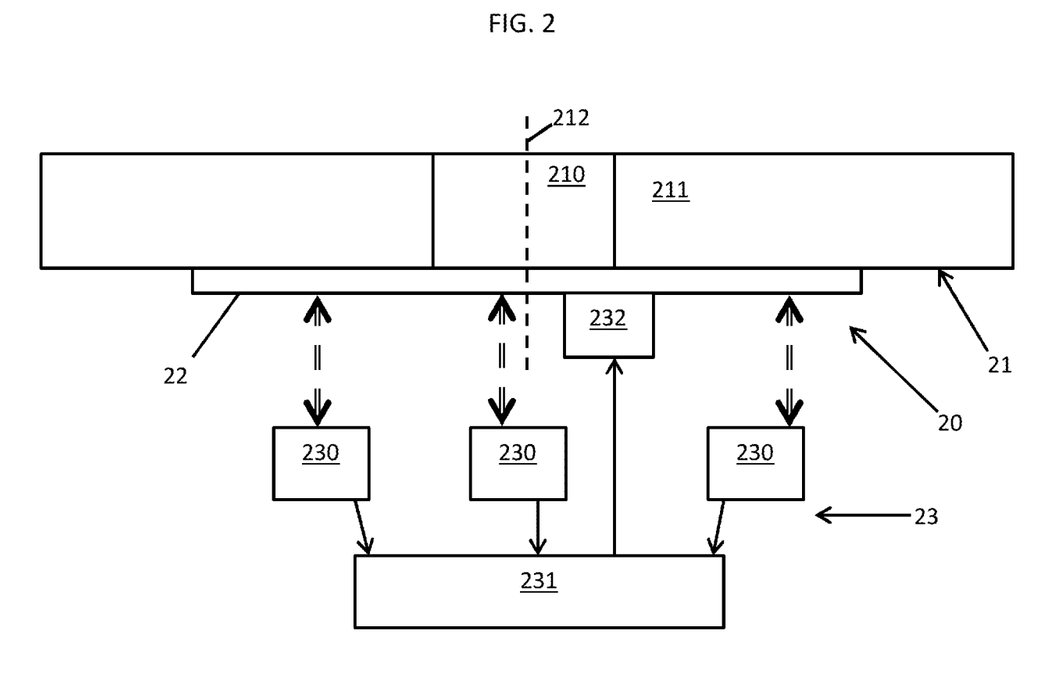
FIG. 2 is a schematic illustration of a rotor balancing system for a rotor of the helicopter of FIG. 1 in accordance with embodiments.

With reference to FIG. 2, a rotor balancing apparatus 20 is provided. The rotor balancing apparatus 20 may be usable with a rotary element 21, such as the main rotor 17 or the tail rotor 18 of the helicopter of FIG. 1 or another rotary element of a different type of device. As shown in FIG. 2, in general, the rotary element 21 includes a central hub portion 210 and radial elements 211. The central hub portion 210 is rotatable about axis of rotation 212 and the radial elements 211 each extend radially outwardly from the central hub portion 210 and also rotate as they are rigidly connected to the hub 210. The rotor balancing apparatus 20 includes a mass balancing system 22. The mass balancing system 22 is coupled to the rotary element 21 and configured to direct a movement of mass into and out of the central hub portion 210 and, in some cases, along the radial elements 211. It will be understood from the description provided below that the radial elements 211 may be provided as hub arms (see FIGS. 3 and 4) or as rotor blades (see FIG. 5).

In accordance with further embodiments, the mass balancing system 22 may be activated in a grounded condition or in an in-flight condition. In either case, the rotor balancing apparatus 20 may further include a sensing system 23 that is coupled to the mass balancing system 22 and configured to activate the mass balancing system 22, such as in response to an unbalanced condition determination in one embodiment. In greater detail, the sensing system 23 may include a plurality of vibration sensors 230, a processing unit 231 and a servo unit 232. The vibration sensors 230 are respectively deployed at various locations with respect to the central hub portion 210 and/or the radial elements 211. At those locations, the vibration sensors 230 are configured to identify vibrations caused by mass unbalance conditions of the central hub portion 210 and the radial elements 211 and to issue signals to the processing unit 231 accordingly. Typically, the vibration sensors are placed in the fuselage 11, but can also be on the radial elements 211 or central hub 210 as shown in addition to or instead of on the fuselage 11.

The processing unit 231 may be embodied as a processor reading instructions from a computer readable medium having executable instructions stored thereon. When executed, the executable instructions cause the processing unit 231 to receive the signals issued by the vibrations sensors 230, to determine based on the signals whether a mass unbalance condition exists and needs to be corrected and to issue commands to the servo unit 232 to activate the mass balancing system 22 in order to correct the mass unbalance condition and to thereby reduce vibrations identified by the vibration sensors 230. The sensing system 23 may be further configured with a feedback loop in order to improve the ability of the sensing system to correct the mass unbalance condition. While not required in all aspects, the computer readable medium can be included in the processing unit 231, or can be in communication with the processing unit 231 through wired and/or wireless transmission mechanisms.

As noted above, the operation of the sensing system 23 and the activation of the mass balancing system 22 can be done in a grounded condition or in an in-flight condition. When in a grounded condition, the processing unit 213 could be attached to the sensors 230 and servo unit 232 while on the ground to perform the balancing functionality. In the latter case, for example, the operation of the sensing system 23 and the activation of the mass balancing system 22 can be done in an in-flight condition in response to changing flight conditions (e.g., moving from an inland area with low winds to a seaside area with high winds).

In accordance with further embodiments, the mass balancing system 22 may be configured to direct the movement of the mass along each radial element 211 separately or from one radial element 211 to another radial element 211. In that latter case, the overall weight of the mass balancing system 22 can be reduced since the ability to transfer mass from one radial element 211 to another radial element 211 require less hardware than the case in which mass is moved only along each radial element 211 separately.

Figure 3:
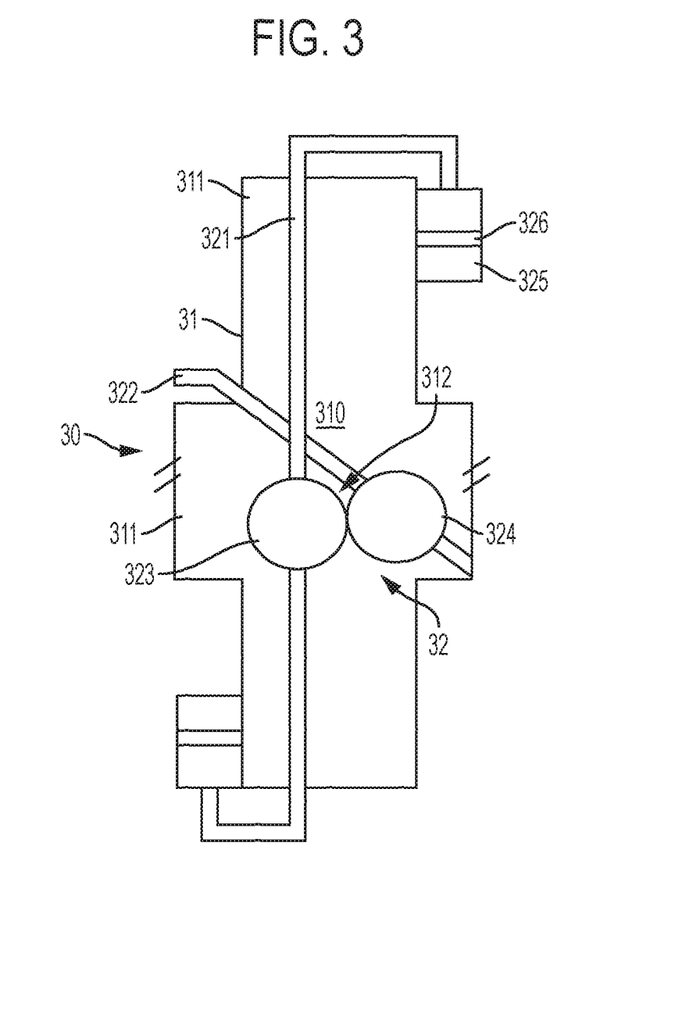
FIG. 3 is a schematic illustration of a rotor balancing system for a rotor of the helicopter of FIG. 1 in accordance with embodiments.
Figure 4:
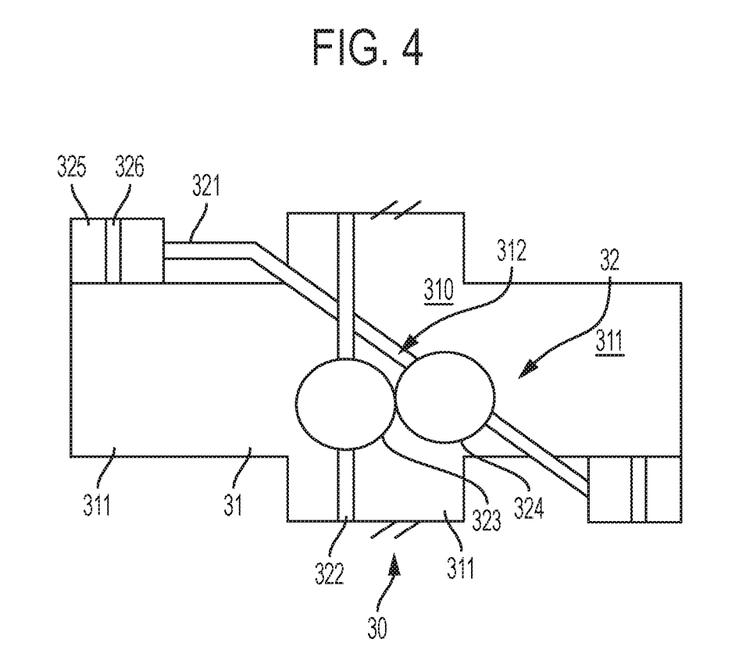
FIG. 4 is a schematic illustration of a rotor balancing system for a rotor of the helicopter of FIG. 1 in accordance with alternate embodiments.

With reference to FIGS. 3 and 4 and, in accordance with alternative embodiments, a rotor balancing system 30 is provided for use with a rotary element 31, such as the main rotor 17 or the tail rotor 18 of the helicopter of FIG. 1 or another rotary element of a different type of device. As shown in FIGS. 3 and 4, the rotary element 31 includes a central hub portion 310 and hub arms 311. The central hub portion 310 is rotatable about axis of rotation 312 and the hub arms 311 each extend radially outwardly from the central hub portion 310. The rotor balancing system 30 includes a mass balancing system 32. The mass balancing system 32 is similar to the mass balancing system 22 and may be coupled to a sensing system, which is similar to the sensing system 23. That is, the mass balancing system 32 is configured to direct a movement of heavy liquid into and out of the central hub portion 310 and along the hub arms 311. In some cases, virtually no heavy liquid is accumulated at the central hub portion 310 but rather is directed to the opposite hub arm 311. In some cases, the mass balancing system 32 may be activated by the sensing system in order to correct a mass unbalance condition that is similar to the above-described condition correction process.

In accordance with embodiments, the heavy liquid may include one or more of Mercury, Galinstan, Sodium Polytungstate or another similar liquid. The heaviness of the liquid permits an overall size of the mass balancing system 32 to be limited but any fluid can be used.

As shown in FIGS. 3 and 4, the mass balancing system 32 may include a first piping system 321 that contains a first portion of the heavy liquid and extends through the central hub portion 310 and along a first pair of opposite hub arms 311 and a second piping system 322 that contains a second portion of the heavy liquid and extends through the central hub portion 310 and along a second pair of opposite hub arms 311. The mass balancing system 32 further includes a first pump 323 disposed along the first piping system 321 and a second pump 324 disposed along the second piping system 322. Both the first pump 323 and the second pump 324 may be offset from the axis of rotation 312 so the mass balancing system 32 may need to compensate for their respective weights. In some cases, the first pump 323 and the second pump 324 may be equidistant from the axis of rotation 312 such that the need for compensation is reduced or eliminated.

The mass balancing system 32 still further includes pressurized volumes 325 disposed at distal ends of the first and second piping systems 321 and 322 and diaphragms 326. The pressurized volumes 325 prevent cavitation of the heavy liquid in the first and second piping systems 321 and 322. The diaphragms 326 serve to separate the pressurized volumes 325 from the heavy liquid contained within the first and second piping systems 321 and 322. While shown as diaphragms 326 and volumes 325, it is understood that pistons can be used with the distal ends of the first and second piping systems 321 and 322 provided as cylinders if a seal between the outer surfaces of the pistons and the inner surfaces of the cylinders can be hermetic or nearly hermetic and maintained throughout use of the rotary element 31. While shown with both diaphragms 326 and pumps 323, 324, it is understood that aspects can utilize diaphragms 326, pistons or pumps 323, 324 alone.

In an event of a mass unbalance condition, at least one or both of the first pump 323 and the second pump 324 will be operated in order to force some of the heavy liquid radially outwardly toward the distal ends of the hub arms 311 or radially inwardly toward the central hub portion 310 or exchange liquid from one hub arm 311 to the opposite hub arm 311 without accumulation at central hub portion 310. Due to the weight of the heavy liquid, an amount of the heavy liquid that is pumped can be small relative to the overall amount of heavy liquid in the mass balancing system 32 and the distance traveled by the pumped heavy liquid need not be substantial relative to an overall size of the rotary element 31.

As shown in FIG. 3, the diaphragms 326 at each distal end of the first and second piping systems 321 and 322 may be disposed radially outwardly from the corresponding pressurized volumes 325. In this case, the first and second piping systems 321 and 322 include u-shaped turns at radially outward portions of the first and second pairs of opposite hub arms 311. Centrifugal forces generated by rotation of the rotary element 31 thus increase a force applied to the diaphragms 326 and the heavy liquid by the pressurized volumes 325. Alternatively, as shown in FIG. 4, the pressurized volumes 325 at each distal end of the first and second piping systems 321 and 322 may be disposed radially outwardly from the corresponding diaphragms 326. In this case, a centrifugal force generated by rotation of the rotary element 31 decreases a force applied to the diaphragms 326 and the heavy liquid by the pressurized volumes 325.

In accordance with an alternative embodiment similar to that shown in FIG. 3 is provided but does not utilize diaphragms 326 or pistons. In this case, the shapes of the pressurized volumes 325 are tapered to enable centrifugal force of rotor rotation to ensure that the pressurizing gas does not enter the first and second piping systems 321 and 322. Thus, entries to the first and second piping systems 321 and 322 are always covered by liquid.

Figure 5:
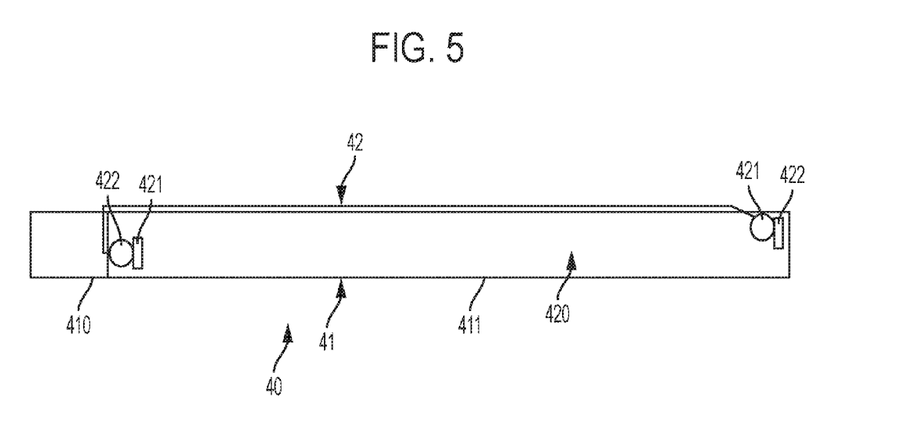
FIG. 5 is a schematic illustration of a rotor balancing system for a rotor of the helicopter of FIG. 1 in accordance with alternate embodiments.

With reference to FIG. 5 and, in accordance with alternative embodiments, a rotor balancing system 40 is provided for use with a rotary element 41, such as the main rotor 17 or the tail rotor 18 of the helicopter of FIG. 1 or another rotary element of a different type of device. As shown in FIG. 5, the rotary element 41 includes a central hub portion 410 and rotor blades 411. The central hub portion 410 is rotatable axis of rotation and the rotor blades 411 each extend radially outwardly from the central hub portion 410. The axis of rotation can be the axis R shown in FIG. 1. The rotor balancing system 40 includes a mass balancing system 42. The mass balancing system 42 is similar to the mass balancing system 22 and may be coupled to a sensing system, which is similar to the sensing system 23, albeit with the axis 212 moved to an edge of radial element 211. That is, the mass balancing system 42 is configured to direct a movement of a gaseous fluid into and out of the central hub portion 410 and along the rotor blades 411. In some cases, the mass balancing system 42 may be activated by the sensing system in order to correct a mass unbalance condition that is similar to the above-described condition correction processes.

As shown in FIG. 5, the mass balancing system 42 includes third piping systems 420 that respectively extend along each of the rotor blades 411, heating-cooling elements 421 disposed at distal ends of the third piping system 420 and fluid reservoirs 422. The fluid reservoirs 422 are fluidly coupled to the third piping systems 420 and are respectively disposed proximate to corresponding ones of the heating-cooling elements 421.

In accordance with embodiments, the heating-cooling elements 421 may be disposed radially outwardly from the corresponding ones of the fluid reservoirs 422. In this case, the third piping system 420 includes a u-shaped turn at radially inward portions of the rotor blade 411. Centrifugal forces caused by the rotation of the rotary element 41 will thus tend to force fluid radially outwardly toward the (inboard) heating-cooling elements 421. While not limited thereto, the elements 421 can be use Peltier or resistive elements to heat and/or cool the fluid at the reservoirs 422.

In an operation of the mass balancing system 42, the fluid reservoirs 422 contain fluid, such as refrigerant, and are heated by the corresponding ones of the heating-cooling elements 421. With sufficient heating, the fluid contained in the fluid reservoirs 422 is evaporated and the resulting gaseous fluid effectively moves along the third piping systems 420 towards the cooler section at the opposite reservoir 422 where the gaseous fluid cools and collects in the opposite reservoir 422. Since the third piping systems 420 are disposed along the rotor blades 411, the gaseous fluid can be driven radially outwardly by a substantially large distance relative to an overall size of the rotary element 41. As such, a lightweight amount of the gaseous fluid can be used to correct a mass unbalance once the rotary element 41 begins to rotate and to generate centrifugal forces accordingly.

While described in terms of relying on thermal cycles to drive the gaseous fluid along the piping systems 420, it is understood that other mechanisms for moving gasses can be used, such as through pressure differentials created using fans, vacuums, bladder systems, and/or pistons.

As noted above, the various embodiments described herein may relate to the movement of mass, of heavy liquid or of gaseous fluid along radial elements 211, hub arms 311 or rotor blades 411 and can be employed to move the same among these features. For example, the mass balancing system 42 can be used to move gaseous fluid from one rotor blade 411 to another possibly adjacent rotor blade 411. In this case, the third piping system 420 proceeds radially inwardly from one of the fluid reservoirs 422 to the central hub portion 410, turns 90 degrees and then proceeds radially outwardly toward the other fluid reservoir 422. As such, the number of fluid reservoirs 422 and heating-cooling elements 421 can be reduced. It is to be understood that a similar configuration can be used for the mass balancing systems 22 and 32.

As described above, a heavy liquid (e.g., mercury or Galinstan) can be pumped between opposite rotor hub arms in order to provide in-flight adjustments of vibration levels. This flow between hub arms will not occur passively because the centrifugal forces that occur when the rotor is spinning will tend to "throw" the heavy liquid to the highest diameter in the container on each hub arm. As the fluid is pumped between the two opposite hub arms, the aircraft vibration will change. An algorithm residing in the vibration detecting and controlling systems will determine when to stop pumping or when to reverse and pump in the other direction. The pumping can be done during ground running in preparation for flight or in-flight to achieve low vibrations at all times. The pumping could also be performed only after a ground run or flight (i.e., only when the rotor is not turning). This would preclude in-flight adjustments but might lessen the demands on the system and result in a less expensive system. Alternatively, a working fluid such as R134a can be used and moved along rotor blades to achieve a similar effect as noted above.

The hub balancing system can be part of a system including the hub balancer, automatically adjustable pitch links for each blade and automatically adjustable trailing edge tabs on each blade to form a complete system controlled by a central control computer to optimally suppress 1/rev vibration on a helicopter. This system can also be part of an active vibration system that reduces blade passage vibration at a frequency of n/rev where n is the number of blades. Such a system is advantageous because a single controller can be used to command both the 1/rev and the n/rev anti-vibration systems.

While the invention has been described in detail in connection with only a limited number of embodiments, it should be readily understood that the invention is not limited to such disclosed embodiments. By way of example, such rotary-system balancing systems can be used to balance rotor hubs or blades of a wind turbine, rotary elements of maritime engines, transmission elements requiring balancing, and/or generators using rotary elements. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A balancing apparatus for a rotary element including a central hub portion and a plurality of distinct radial elements extending outwardly from the central hub portion the plurality of distinct radial elements including first and second hub arms and third and fourth hub arms, the balancing apparatus comprising:
    a first conduit extending along each of the first and second hub arms via the central hub portion;
    a second conduit extending along each of the third and fourth hub arms via the central hub portion;
    a first mass in the form of a heavy liquid movable within the conduit between each of the first and second hub arms via the central hub portion;
    a second mass in the form of a heavy liquid movable within the conduit between each of the third and fourth hub arms vie the central hub portion;
    a first pump disposed along and fluidically connected with the first conduit, a pressurized volume disposed at distal ends of the first conduit, and a diaphragm separating the pressurized volume from the heavy liquid;
    a second pump disposed along and fluidically connected with the second conduit, the second pump being fluidically isolated from the first pump, a pressurized volume disposed at distal ends of the second conduit, and a diaphragm separating the pressurized volume from the heavy liquid; and
    a mass balancing system configured and disposed to direct movement of the mass within the conduit into and out of the central hub portion and along one or more of the plurality of radial elements.

2. The balancing apparatus according to claim 1, wherein the mass balancing system is activatable in-flight.

3. The balancing apparatus according to claim 1, further comprising a sensing system coupled to the mass balancing system and configured to activate the mass balancing system in response to an unbalanced condition determination.

4. The balancing apparatus according to claim 1, wherein the mass balancing system is configured to direct the movement of the mass from one of the plurality of distinct radial elements to another of the plurality of distinct radial elements.

5. The balancing apparatus according to claim 1, wherein the heavy liquid comprises one or more of Mercury, Galinstan or Sodium Polytungstate.

6. A rotor system comprising:
    a central hub portion;
    a plurality of hub arms cantilevered the central hub portion, the plurality of hub arms including first and second opposing hub arms and third and fourth opposing hub arms; and
    a rotor balancing system comprising:
    a first conduit including a first piping extending from the central hub portion into each of the first and second hub arms;
    a second conduit extending from the hub portion into each of the third and fourth hub arms;

a heavy liquid movable within the conduit between each of the plurality of hub arms via the central hub portion;

a first pump disposed along and fluidically connected with the first piping, a pressurized volume disposed at distal ends of the first piping, and a diaphragm separating the pressurized volume from the heavy liquid;

a second pump disposed along and fluidically connected with the second piping, the second pump being fluidically isolated from the first pump, a pressurized volume disposed at distal ends of the second piping, and a diaphragm separating the pressurized volume from the heavy liquid; and a mass balancing system configured and disposed to direct movement of the heavy liquid into and out of the central hub portion and along each of the plurality of hub arms.

7. The rotor system according to claim 6, wherein the heavy liquid comprises one or more of Mercury, Galinstan or Sodium Polytungstate.

8. The rotor system according to claim 6, wherein the first pump is offset from an axis of rotation of the rotary element.

9. The rotor system according to claim 6, wherein the diaphragm is disposed radially outwardly from the pressurized volume.

10. The rotor system according to claim 6, wherein the pressurized volume is disposed radially outwardly from the diaphragm.

* * * * *